United States Patent [19]
Krause

[11] Patent Number: 6,056,808
[45] Date of Patent: May 2, 2000

[54] MODULAR AND LOW POWER IONIZER

[75] Inventor: Hans W Krause, Oakville, Canada

[73] Assignee: DKW International Inc., Vaughan, Canada

[21] Appl. No.: 08/973,344

[22] PCT Filed: May 31, 1996

[86] PCT No.: PCT/CA96/00358

§ 371 Date: Dec. 1, 1997

§ 102(e) Date: Dec. 1, 1997

[87] PCT Pub. No.: WO96/38229

PCT Pub. Date: Dec. 5, 1996

Related U.S. Application Data

[63] Continuation-in-part of application No. 08/457,680, Jun. 1, 1995, Pat. No. 5,578,112.

[51] Int. Cl.[7] .................................. B03C 3/41; B03C 3/68
[52] U.S. Cl. .......................... 96/24; 96/82; 96/92; 96/96; 96/97; 96/98; 361/235
[58] Field of Search .................................. 96/80, 83, 84, 96/69, 92, 25, 94–98, 26, 23, 24, 82; 95/78, 80, 81; 361/226, 235; 323/903

[56] References Cited

U.S. PATENT DOCUMENTS

| | | | |
|---|---|---|---|
| 1,130,212 | 3/1915 | Steere | 96/97 X |
| 1,357,202 | 10/1920 | Nesbit | 96/75 |

(List continued on next page.)

FOREIGN PATENT DOCUMENTS

| | | | |
|---|---|---|---|
| 0850276 | 8/1990 | European Pat. Off. | |
| 0424335 | 4/1991 | European Pat. Off. | |
| 526021 | 6/1931 | Germany | |
| 850598 | 9/1952 | Germany | |
| 1002292 | 2/1957 | Germany | 96/96 |
| 1591009 | 6/1970 | Germany | |
| 1963715 | 6/1971 | Germany | |
| 3930872 | 3/1991 | Germany | |
| 8501858 | 7/1985 | Sweden | |
| 737734 | 9/1955 | United Kingdom | |
| 1218711 | 1/1971 | United Kingdom | 96/94 |
| 1238438 | 7/1971 | United Kingdom | |
| 1481655 | 8/1977 | United Kingdom | |

*Primary Examiner*—Richard L. Chiesa
*Attorney, Agent, or Firm*—Ridout & Maybee

[57] ABSTRACT

An apparatus for ionizing air to remove particulate matter. The apparatus including an ionizer and a bracket for mounting the ionizer and a bracket for mounting the ionizer in a duct or enclosure. The ionizer includes a series of electrodes which span a portion of the duct. The electrodes are energized by a high voltage circuit and an ionic wind is created between the electrode and duct. The ionic wind sweeps particles in the air to the duct which provides a collector electrode. In another embodiment, a ring collector electrode is also provided for spanning the inner portion of the duct. The high voltage circuit includes a DC power supply, a high voltage transformer, a high voltage multiplier stage and a push-pull switching circuit. The DC power supply receives AC power and generates a DC output which is coupled to the primary of the transformer. The push-pull switching circuit produces a controlled and efficient AC output in the transformer by alternately switching the primary winding. The output voltage from the secondary winding is further increased by the multiplier stage to a level sufficient to energize the electrodes and produce the ionic wind. The apparatus also comprises a high voltage multiplier stage.

10 Claims, 9 Drawing Sheets

U.S. PATENT DOCUMENTS

| | | | |
|---|---|---|---|
| 2,097,233 | 10/1937 | Meston | 118/624 |
| 2,637,408 | 5/1953 | Yadoff | 96/80 X |
| 2,868,318 | 1/1959 | Perkins et al. | 96/94 |
| 3,157,479 | 11/1964 | Boles | 96/82 |
| 3,582,711 | 6/1971 | Jahnke | 361/231 |
| 3,695,001 | 10/1972 | Watanabe | 95/78 |
| 3,745,749 | 7/1973 | Gelfand | 96/21 |
| 3,765,153 | 10/1973 | Grey | 55/447 X |
| 3,768,258 | 10/1973 | Smith et al. | 96/97 X |
| 3,872,370 | 3/1975 | Regnault | 361/235 |
| 4,216,000 | 8/1980 | Kofoid | 96/80 |
| 4,284,417 | 8/1981 | Reese et al. | 95/3 |
| 4,400,675 | 8/1983 | Thomas | 336/160 |
| 4,536,698 | 8/1985 | Shevalenko et al. | 96/80 X |
| 4,689,056 | 8/1987 | Noguchi et al. | 96/79 |
| 4,772,998 | 9/1988 | Guenther, Jr. et al. | 96/25 X |
| 5,404,079 | 4/1995 | Ohkuni et al. | 361/235 X |
| 5,578,112 | 11/1996 | Krause | 96/24 |

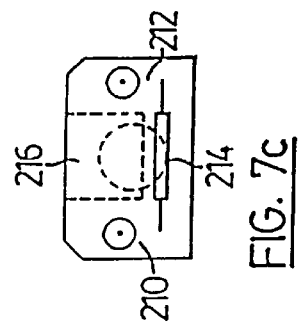
FIG. 7c
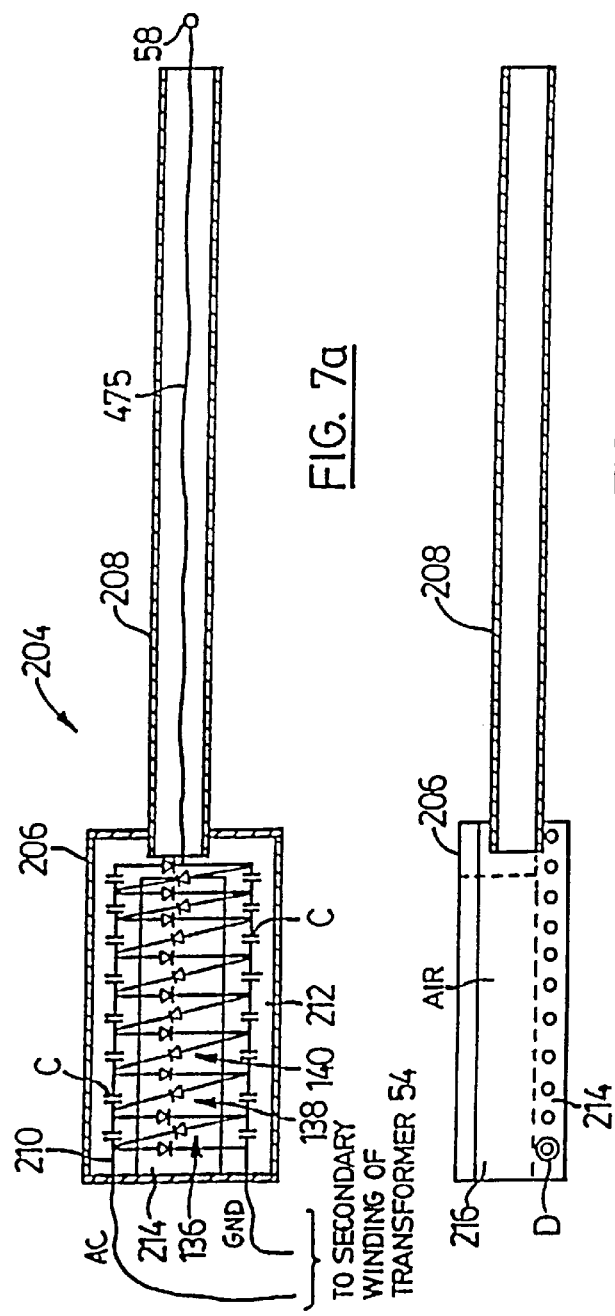
FIG. 7a
FIG. 7b

MODULAR AND LOW POWER IONIZER

This application is a continuation-in-part of U.S. patent application Ser. No. 08/457,680, filed on Jun. 1, 1995 now U.S. Pat. No. 5,578,112, and a national stage application of International Patent Application No. PCT/CA96/00358.

This invention relates to ionizers and more particularly to a modular and low power ionizer suitable for commercial and residential use.

BRIEF SUMMARY OF THE INVENTION

Conventional ionizers or precipitators comprise large and very specialized devices. These devices are intended for large industrial applications, for example a cement factory, and have high power requirements. Due to their large power requirements, the ionizers include separate high voltage power supplies and tend to be very bulky and costly to manufacture and maintain. The devices are typically designed as stand-alone units which are coupled to existing ventilation or heating and cooling equipment. For these reasons, known devices are not well-suited for commercial applications, such as once buildings, or residential or consumer use. Published European Patent Application No. 90850276.8 discloses one such device according to the prior art.

In an office building, the air circulation system includes a filter bank which comprises a matrix of filter modules. Each filter module typically has a mechanical filter element which traps particulate matter in the air before the air is circulated. The filter elements need to be replaced on a regular basis thereby incurring both maintenance and replacement costs. There is also a cost associated with the disposal of the used filter elements. For medical facilities, the filter elements are treated as hazardous biological waste and the disposal costs are significant. Furthermore, the air circulation fans must have the capacity to push the "dirty air" through the filter elements. For a typical once building this means large electric motors with a high horsepower output to drive the circulation fans, which further increases the cost of a conventional air conditioning/heating installation.

There is also reason to believe that filter elements which have become contaminated may contribute to "sick building syndrome".

BRIEF SUMMARY OF THE INVENTION

Accordingly, there is a need for an ionizer which is suitable for commercial and residential use. It is an object of the present invention to provide a modular ionizer which may be integrated with an existing heating or cooling duct in the heating and cooling equipment (HVAC) of a building. It is another object of the present invention to provide an ionizer with an integrated high voltage generator which is operated from conventional AC power and features low power consumption. It is a further object of the present invention to provide an ionizer which produces negligible amounts of ozone as a by-product of the ionization process. It is yet a further object of the present invention to provide a modular ionizer which is arranged with other ionizer modules to form an ionizer bank or matrix suitable for use in larger installations such as those found in residential condominiums, office buildings, medical facilities, laboratories, food processing plants, electronic assembly (i.e. "clean-room") plants, and manufacturing and industrial plants.

In a first aspect, the present invention provides an apparatus for purifying gas flowing in a duct by establishing a radially directed ionic wind within the duct to sweep particulate solids directly onto one or more collector electrodes, said apparatus comprising: (a) an ionizing unit; (b) means for supporting said ionizing unit within the duct, said ionizing unit comprising, (i) a water-tight housing, (ii) a high voltage generator within the housing and having a high voltage output, (iii) an electrode support rod coupled to said high voltage output and extending from said housing coaxially within said duct, (iv) at least one group of ionizing electrodes mounted on said support rod and extending radially therefrom; and (c) means for connecting said high voltage generator to an external low voltage power supply.

In a second aspect, the present invention provides an air purifier for purifying air in an enclosed space and said enclosed space being provided with an AC power supply, said air purifier comprising: (a) an enclosure having at least one collecting electrode; (b) an ionizing unit; (c) means for supporting said ionizing unit inside said enclosure, said ionizing unit comprising, (i) a water-tight housing, (ii) a high voltage generator within said housing for generating a high voltage output, (iii) an electrode support rod coupled to said high voltage output and extending from said housing coaxially within said duct, (iv) at least one group of ionizing electrodes mounted on said support rod and extending radially therefrom for establishing a radially directed ionic wind within said enclosure to sweep particulate solids in the air directly onto said collector electrode; (d) means for connecting said high voltage generator to the external AC power supply; and (e) said enclosure including an air intake port and an air exhaust port.

In a third aspect, the present invention provides a high voltage multiplier stage comprising: (a) an input port for receiving an input voltage signal; (b) a body member having two side channels for mounting capacitors and a bottom channel for mounting diodes, and said capacitors and diodes being coupled to form a plurality of stages for said high voltage multiplier; (c) said bottom channel being disposed between said side channels; (d) said last stage providing an output port for said high voltage multiplier.

BRIEF DESCRIPTION OF THE DRAWINGS

Reference will now be made to the drawings which illustrate, by way of example, a preferred embodiment of the present invention, and in which:

FIGS. 7(a) to 7(c) show in schematic form an embodiment for a high voltage multiplier according to the present invention, and wherein FIG. 7(a) is a top view of the high voltage multiplier, FIG. 7(b) is a side view, and FIG. 7(c) is an end view.

DETAILED DESCRIPTION OF THE PREFERRED EMBODIMENTS

Figure 1:
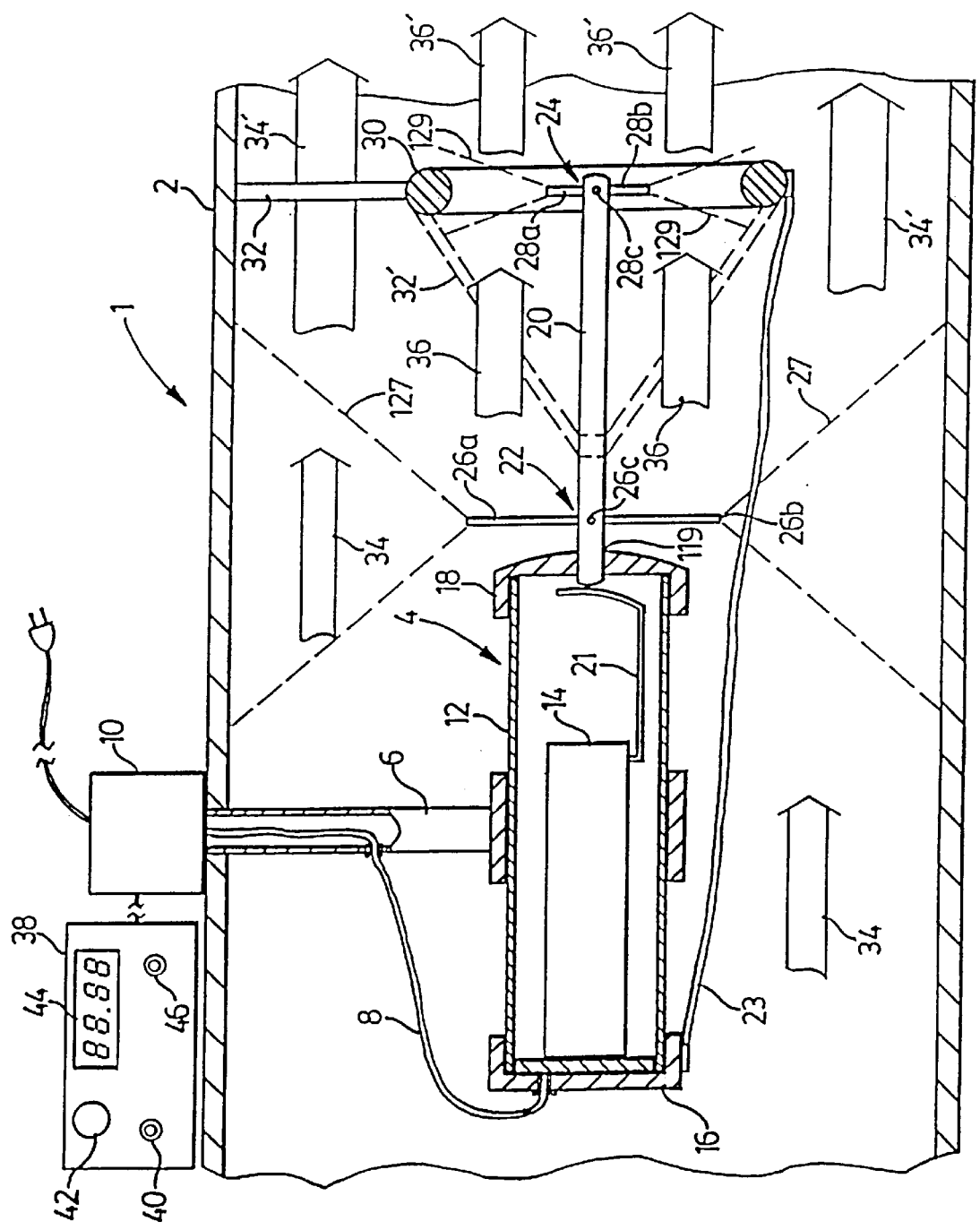
FIG. 1 is a cross-sectional view of an ionizing apparatus according to the present invention.

Reference is first made to FIG. 1 which shows an ionizing apparatus 1 according to the present invention. The ionizing apparatus 1 comprises a tubular member or conduit 2 and an ionizer 4. As shown, the ionizer 4 is mounted coaxially inside the tubular member 2 by a support bracket 6. The tubular member 2 can comprise an existing duct connected to the heating and cooling equipment (HVAC) of a building. Alternatively, the tubular member 2 can comprise a separate member which provides a housing or enclosure and an ionization chamber for the ionizer 4. The support bracket 6 also provides a power feed for the ionizer 4. The power feed comprises a power cable 8 coupled to a mains supply module 10.

In FIG. 1, the ionizer 1 is shown mounted horizontally in the tubular member 2. It will be appreciated that the ionizer 1 may also be mounted vertically in a vertical tubular member for example.

Figure 4A:
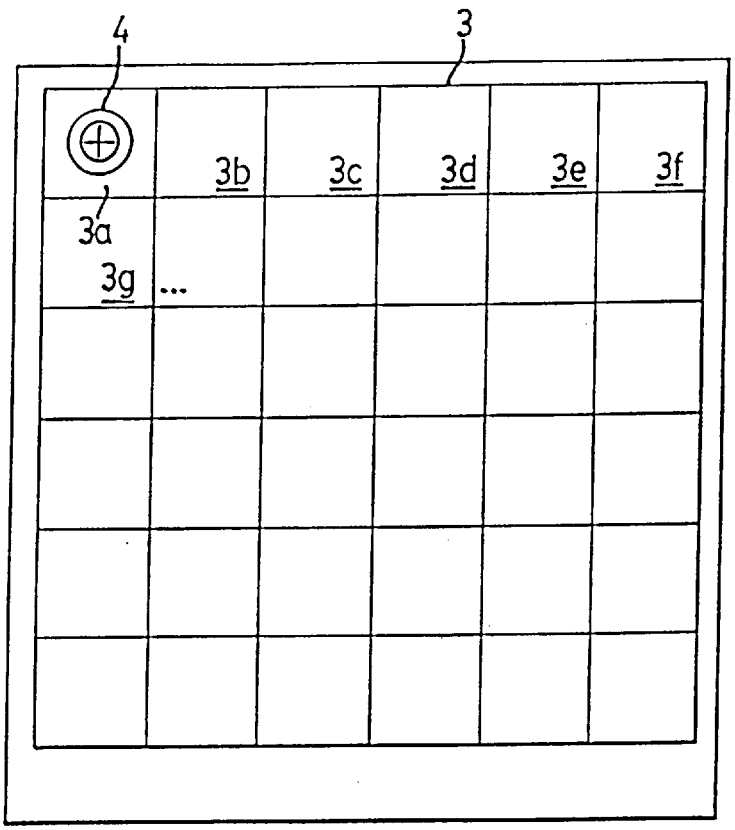
FIG. 4(a) shows a bank of ionizers according to the invention.
Figure 4B:
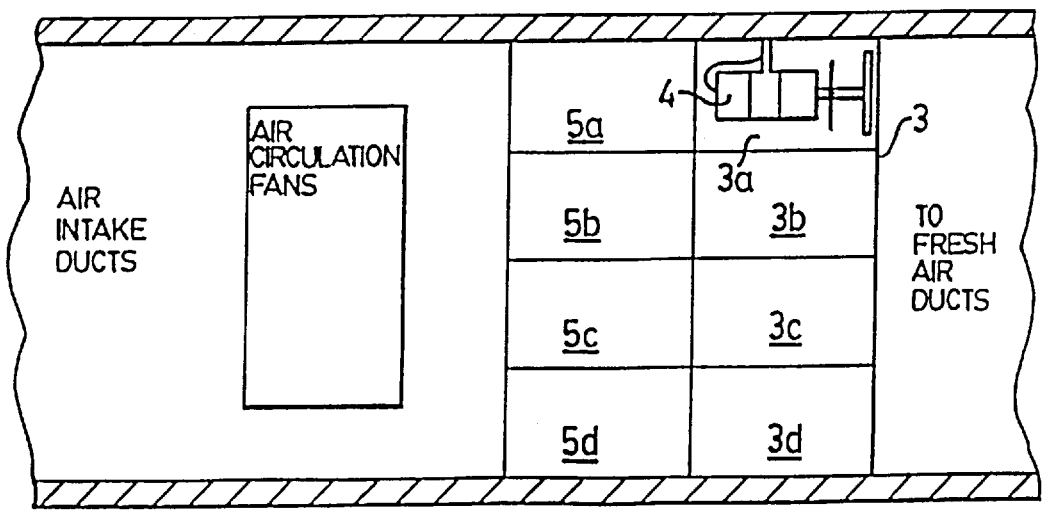
FIG. 4(b) shows another arrangement for a bank of ionizers according to the invention.

It is a feature of the present invention that the ionizer 4 is powered using conventional AC or "mains" power and the supply module 10 is simply plugged into a wall socket. The module 10 includes a conventional 115 VAC transformer. Furthermore, the modular nature of the device 1 allows the ionizer 4 to be integrated with the existing heating or cooling system of a building. For example, the tubular member 2 can comprise a heating duct connected to the furnace. The bracket 6 attaches the ionizer 4 to the duct 2 and power is provided by an electrical outlet. For larger applications, e.g. an once building, the ionizers 4 are arranged in a bank or matrix 3 as shown in FIG. 4(a). The bank 3 comprises a plurality of modules or cells 3a, 3b, 3c, 3d . . . each having an ionizer 4 (as depicted for the first cell 3a). The bank or matrix 3 of ionizers 4 can replace or augment the existing air filter bank (not shown). The ionizers 4 can also be "daisy chained" inside the air circulation duct as shown in FIG. 4(b). In FIG. 4(b), another column of modules 5a, 5b, 5c, 5d are located behind the modules 3a, 3b, 3c, 3d. This arrangement can increase the amount of particulate matter removed from the air.

Alternatively, the device 1 is manufactured as a stand-alone unit which is positioned in a room, for example in a residential home, and plugged into a wall socket. The stand-alone unit includes intake and exhaust ports and can also have a fan (not shown). It will be appreciated that such a stand-alone unit will need appropriate EMI shielding and safety features.

As shown in FIG. 1, the ionizer 4 comprises a water-tight enclosure 12 which houses a high voltage circuit 14. One end of the enclosure 12 is sealed by an aluminum lid 16 which also acts as a heat sink for the high voltage circuit 14. The heat sink capability of the lid 16 is augmented by the flow of air 34 through the duct 2, however, the direction for the air flow 34 can be opposite to that shown in FIG. 1. A cap 18 is attached to the other end of the enclosure 12 and provides a water-tight seal. Attached to the cap 18 through a sealed (e.g. rubber gasket) opening 119 is an electrical discharge rod 20. The discharge rod 20 is electrically coupled through a contact 121 to the circuit 14 and receives the high voltage output generated by the circuit 14. The electrical discharge rod 20 preferably includes two or more groups of ionizing electrodes with two groups of electrodes 22,24 being shown in FIG. 1. Each group of ionizing electrodes 22,24 comprises four wires 26a, 26b, 26c and 28a, 28b, 28c with the fourth wire not being shown. The distance between adjacent ionizing electrodes, i.e. 26a and 28a, is approximately 18 inches. Each group of ionizing electrodes 22,24 can comprise more than four wires, but preferably there are at least four wires. In another embodiment, the ionizing electrodes 22,24 may be replaced by a wire mesh having openings of approximately 0.5 inches square.

As shown in FIG. 1, there is also provided a ring 30. The ring 30 is coupled to the duct 2 by a bracket 32 as shown in FIG. 1. Alternatively, the ring 30 is supported by an insulated bracket 32' (shown in broken outline) which is connected to the rod 20 and the ring 30 is held at the desired potential, e.g. ground, using an insulated wire 33. The ring 30 is made from a conductive material such as copper and provides a collector electrode for the second group of ionizing electrodes 24. As shown in FIG. 1, the ionizing electrodes 28a, 28b are shorter than the ionizing electrodes 26a, 26b in the first group 22, and the combination of the ring 30 and ionizing electrodes 28a, 28b (and 28c, 28d) ionizes a portion of the airflow in the duct 2 which does not pass over the first group of ionizing electrodes 22. The ring 30 is suitable for use with the high voltage circuit 14 for producing a 60 kV output.

In operation, the high voltage circuit 14 produces a high voltage output from about 60 kV to 135 kV at 150 Watts. (The transformer, i.e. triple core, arrangement shown in FIG. 6 is utilized for producing the 135 kV output.) The high voltage output energizes the discharge rod 20 and the ionizing electrodes 26,28. A flow of "dirty" air (or gas) 34 is passed through the ionization chamber, e.g. duct 2, and the air molecules and particulate matter in the air flow 34 are ionized as they pass by the ionizing electrodes 26,28. (The dirty air 34 will contain particulate solids, such as dust, smoke and the like.) An ionic wind 127 (shown using a broken line outline) is produced between the wires 26 forming the first ionizing electrode group 22 and the inside surface of the duct 2. The duct 2 (i.e. inside surface of the duct 2) provides a collector electrode for collecting particles which are picked up by the action of the ionic wind 127. The primary function of the duct 2 is to act as a "collector" electrode to collect the particulate solids which are swept by the ionic wind 127 created by the ionizing electrodes 26a, 26b, 26c, 26d. (The duct 2 can also act as a "Faraday" cage or shield.) Similarly, for the second group of ionizing electrodes 24, an ionic wind 29 (shown using a broken line outline) is generated between the tips of the ionizing electrodes 28a, 28b, 28c, 28d and the ring 30. The ionic wind 129 is predominantly negative, and therefore the ring 30 is grounded by the duct 2 or the insulated wire 33. The ionic wind 129 generated by the second group of ionizing electrodes 24 is intended for dirty air 36 which flows inside of the ionizing electrodes 26a, 26b, 26c, 26d, for example, due to the turbulence caused around the end cap 18. The resulting clean air flow 34' and 36' continues to pass through the duct 2.

It has been found that the efficacy of the ionizer 4 increases with the arrangement of the ring 30 and the ionizing electrodes 28a, 28b, 28c, 28d. Preferably, the distance between tips of the ionizing electrodes 26a, 26b, 26c, 26d (or electrodes 28a, 28b, 28c, 28d) and the duct 2 (or ring 30) is in the range 10 to 15 cm. It will be appreciated that the distance is also dependent on the field strength produced by the ionizer 4.

There may also be applications where is advantageous to replace the ring 30 and electrodes 28 with electrodes (not shown) which extend approximately the same distance as the electrodes 26. For example, when generating a full 135 kV output the ring 30 is not used.

As shown in FIG. 1, the ionizing apparatus 1 can also include a control panel 38. The control panel 38 provides a user interface for set-up and maintenance. The control panel 38 includes an ON/OFF switch 40, a POWER OUTPUT indicator 42 and an output current meter 44. Optionally, the control panel 38 may include a RESET switch 46.

For maintenance, a water jet is used to clean the particles which have accumulated on the inside surface of the duct 2 or on the surface of the ring 30. Because the enclosure 12 is water-tight, the device 1 may be conveniently washed without removing the ionizer 4 from inside the duct 2. Alternatively, the modular nature of ionizer 4 and support bracket 6 permit the ionizer 4 to be removed and the inside surface of the duct 2 (or housing) scrubbed or washed without the ionizer 4 in place.

As shown in FIG. 1, a feature of the present invention is the arrangement of the high voltage circuit 14 inside a water-tight enclosure 12 which is mounted coaxially in the member 2. This arrangement simplifies construction and installation of the device 1 in existing duct work, and also facilitates cleaning of the device 1. The modular nature of the ionizer 4 also makes it suitable for forming a bank or matrix 3 as shown in FIGS. 4(a) and 4(b). Another feature of the present invention is the capability to use conventional AC power to operate the device 1 which makes the device 1 attractive for wide-spread applications, e.g. commercial office buildings and private residential homes, in addition to industrial applications. This advantage is realized by the high voltage circuit 14 according to this aspect of the present invention.

Figure 2:
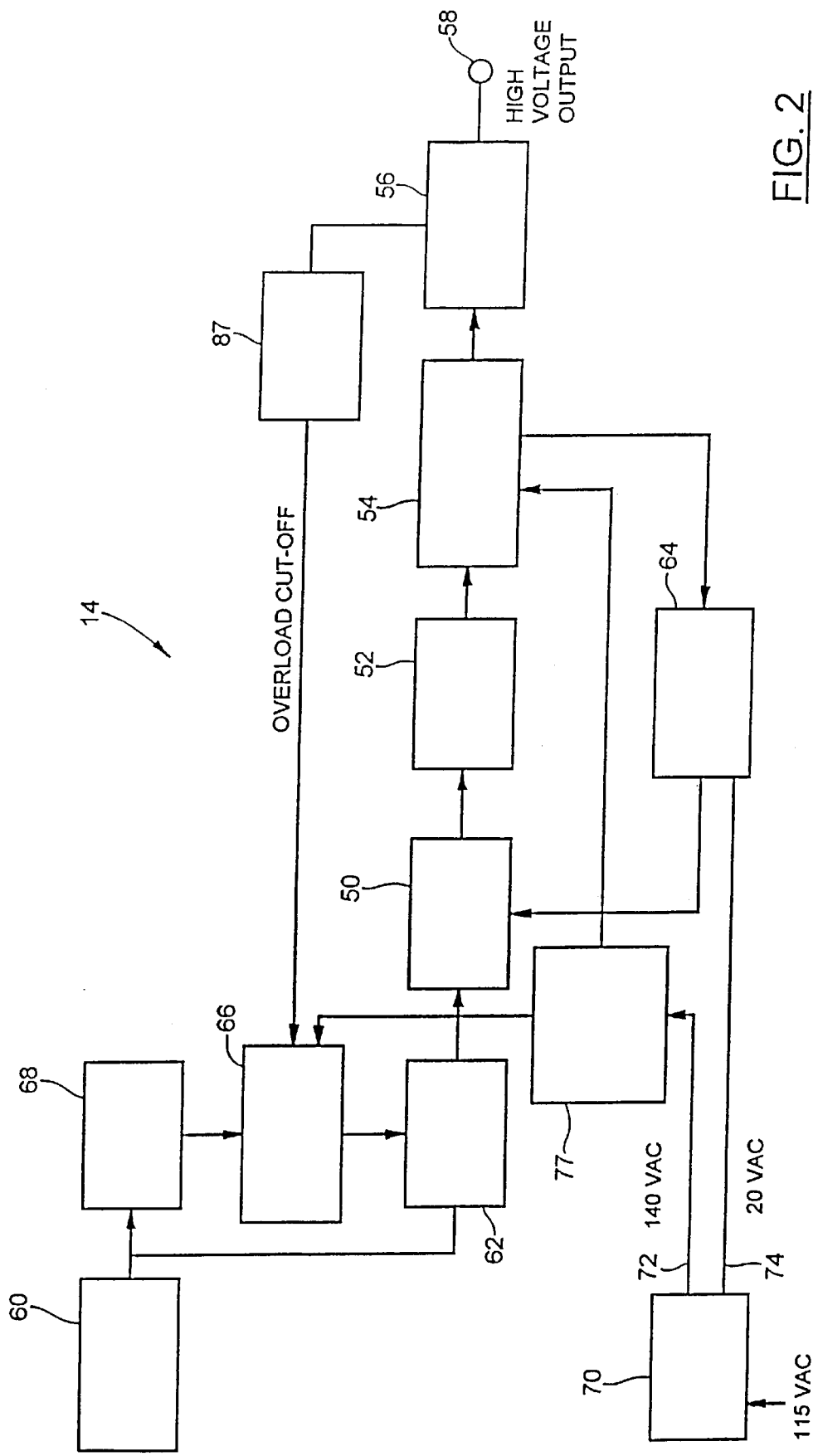
FIG. 2 is a block diagram of circuitry of the apparatus of FIG. 1.

The high voltage circuit 14 is shown in block diagram form in FIG. 2. The high voltage circuit 14 comprises a pulse control module 50. The pulse control module 50 is coupled to an output drive module 52. The output drive module 52 comprises a "push-pull" circuit which drives the primary winding of a high voltage transformer 54. As will be described, the pulse control module 50 produces pulse signals for controlling the "push-pull" circuit in the output drive module 52. The output, i.e. secondary winding, of the high voltage transformer 54 is coupled to a high voltage multiplier 56. The high voltage multiplier 56 increases the voltage in the secondary winding of the transformer 54 to a suitable high voltage level at an output port 58. (The high voltage multiplier 56 is described below with reference to FIG. 7) The high voltage output 58 is coupled to the discharge rod 20 (FIG. 1) through an electrical contact terminal 121 (FIG. 1). The high voltage transformer 54 together with the high voltage multiplier 56 generate the high voltage output (e.g. up to 135 kV) for energizing the ionizing electrodes 26,28 connected to the discharge rod 20 (FIG. 1).

According to another aspect of the present invention the high voltage transformer 54 (depicted in FIG. 6) and the high voltage multiplier 56 (depicted in FIG. 7) form a "tuned" circuit to operate the transformer 54 in resonance to generate the high output voltage levels, i.e 135 kV.

Referring to FIG. 2, the high voltage circuit 14 includes an oscillator 60. The oscillator 60 provides a reference trigger signal for the pulse control module 50. The output from the oscillator 60 is coupled to the pulse control module 50 through a buffer stage 62. The buffer stage 62 provides the drive for the reference trigger signal and prevents loading of the output from the oscillator 60.

The high voltage circuit 14 also includes an output regulator 64 as shown in FIG. 2. The output regulator 64 is coupled to the transformer 54 and the pulse control module 50. The output regulator 64 comprises a feedback circuit which controls the pulse control module 50 on the basis of the output of the high voltage transformer 54. As will be described in more detail below, the output regulator 64 is configured to regulate the output voltage or the output current. In current regulation mode, the output current is maintained at a predetermined value, e.g. 250 $\mu$A, and the voltage level is allowed to vary in a range, e.g. 60 kV to 135 kV. In voltage regulation mode, the output voltage level is maintained at a preselected value as set by the potentiometer 146 (FIG. 3(c)).

Figure 3A:
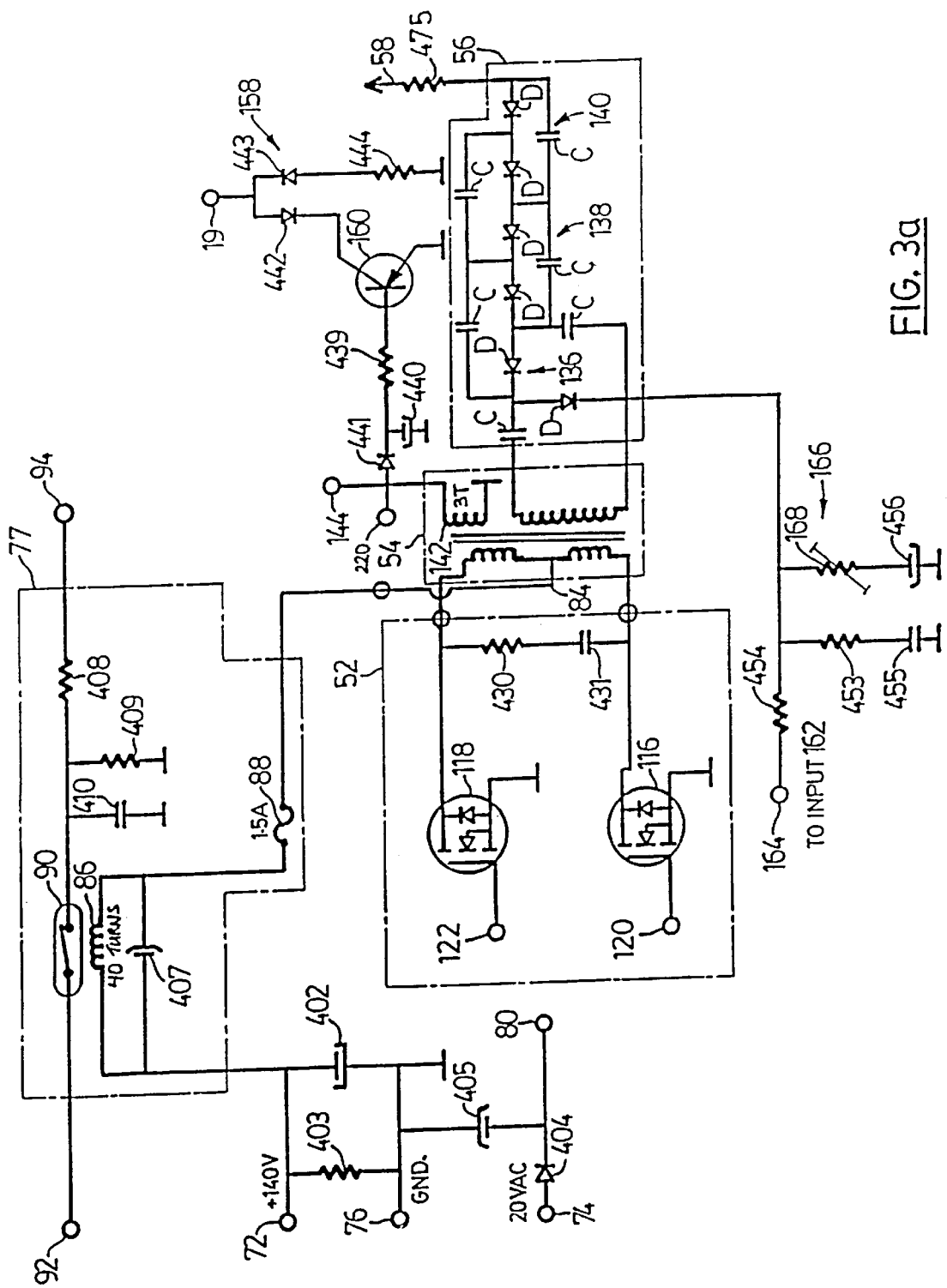
FIGS. 3(a) to 3(c) show the circuitry of FIG. 2 in schematic form.
Figure 3B:
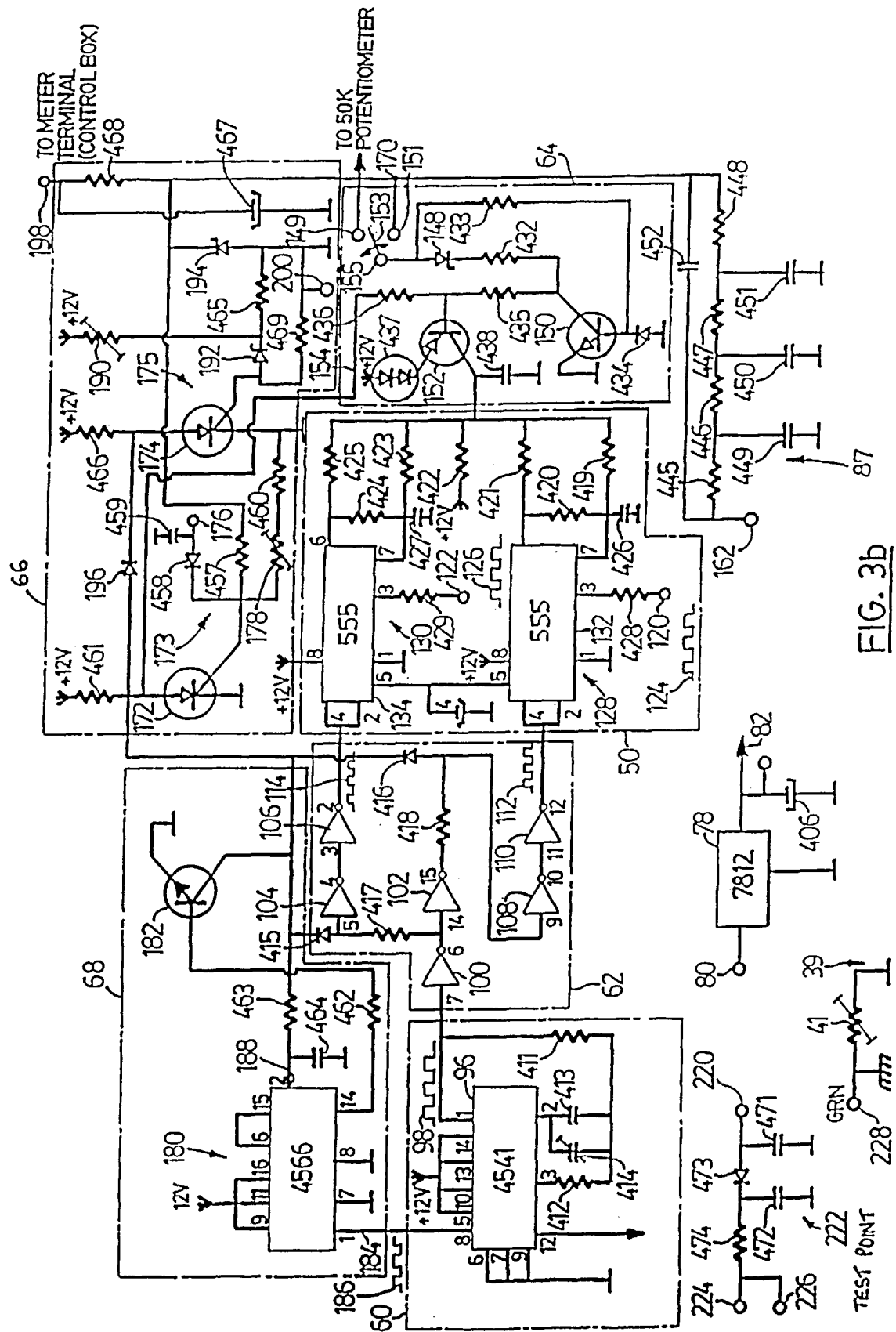
Figure 3C:
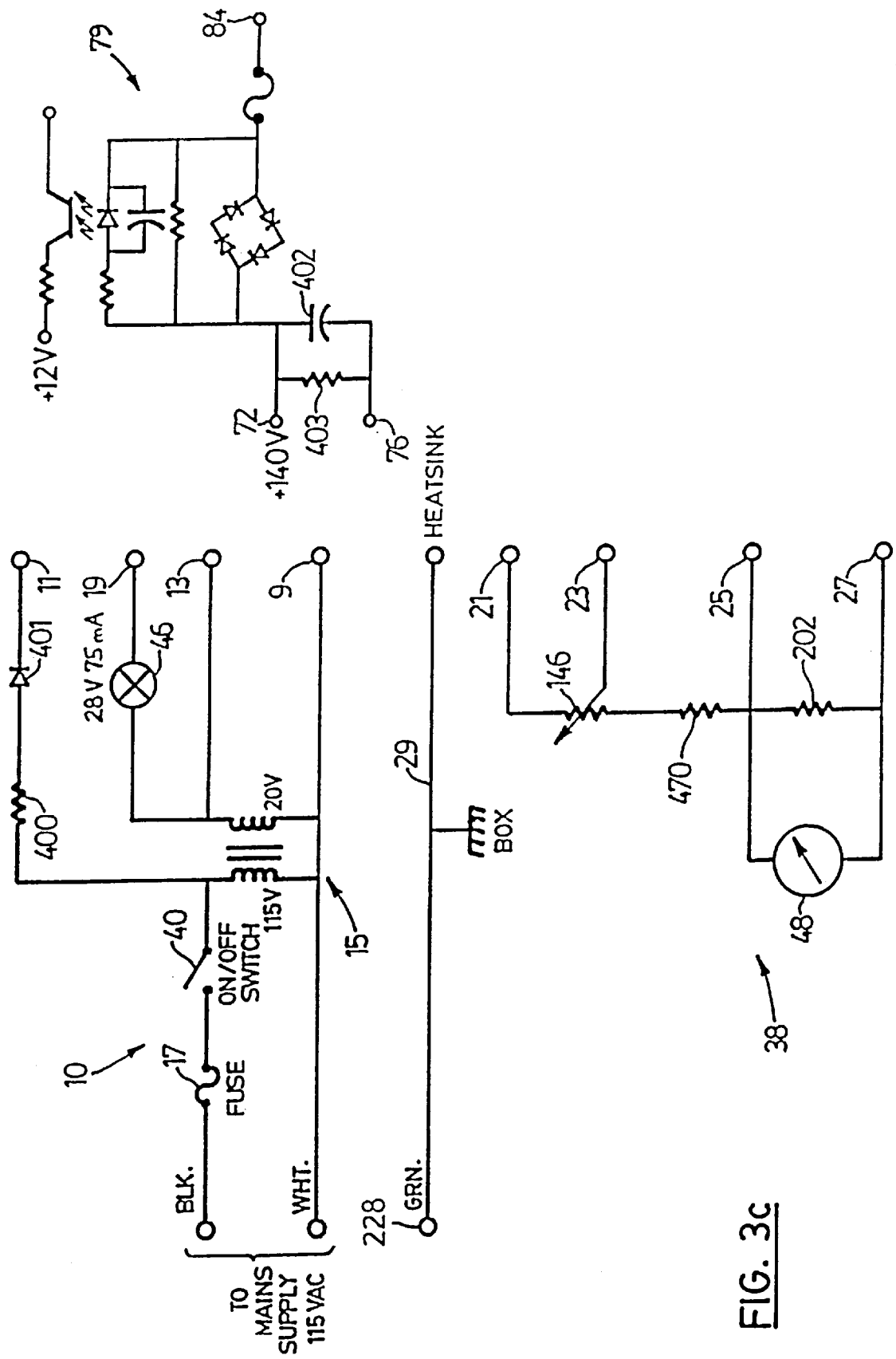

The high voltage circuit 14 is powered by the power supply module 70. The power supply module 70 comprises the mains supply module 10 (FIG. 1) which is connected to the mains supply through a conventional cable and plug. The mains supply module 10 provides a 140 VDC output at terminal 11 and a 20 VAC output at terminal 13. The mains supply module 10 is shown in FIG. 3(c) and comprises an AC line transformer 15. The primary winding of the AC line transformer 15 is coupled to the mains supply cable and includes a wired fuse 17 and the ON/OFF switch 40. As shown the terminal 11 for 140 VDC supply is coupled to the primary of the transformer 15 through a resistor 400 and rectified by a diode 401. The secondary winding "steps down" the voltage to provide the 20 VAC supply at the terminal 13. The 140 VDC and 20 VAC terminals 11, 13 and a terminal 9 for ground (GND) are coupled to the high voltage circuit 14 through a cable 8.

The cable 8 comprises a multi-conductor cable and additional conductors are included for connecting the circuit 14 (located in the enclosure 12) to the lamp 46 through terminal 19, to a voltage output level adjust potentiometer 146 through terminals 21, 23, to the current meter 48 through terminals 25, 27. The cable 8 also includes a conductor which connects the lid 16 (FIG. 1) to a surge suppressor, i.e. ground spike, circuit 39 shown in FIG. 3(b) and comprising a varistor 41. The conductor 29 is also coupled to the chassis for the control panel 38.

Referring back to FIG. 2, the high voltage circuit 14 also includes an overload protection module 66 and short circuit protection module 77. The overload protection module 66 has an input coupled to the high voltage multiplier 56, an input coupled to the short circuit protection module 77, an output coupled to the buffer stage 62, and another output coupled to the output regulator 64. The input from the high voltage multiplier 56 preferably includes a filter network 87 which is described in more detail below.

If the output current of the high voltage circuit 14 exceeds a predetermined amount, the overload protection circuit 66 is triggered to disable the pulse control module 50 (through the buffer stage 62 input) and thereby the output drive module 52.

The overload protection module 66 is also triggered if a short circuit condition exists, for example, the high voltage transformer 54 malfunctions and draws a large current. If a short circuit condition occurs, the short circuit protection module triggers the overload protection module 66. The overload protection module 66, in turn, shuts down the circuit 14 by disabling the pulse control module 50 and output drive module 52.

Once triggered the pulse control module 50 remains disabled until the overload protection module 66 is reset. The high voltage circuit includes a reset module 68 for resetting the overload protection module 66. The reset module 68 automatically generates a reset signal after a predetermined time. The reset module 68 can also be activated by manually depressing a reset switch (not shown) located on the control panel 38. If the overload protection module 66 is triggered by the short circuit module 77, then preferably the circuit 14 is enabled only manually so as to provide an opportunity to investigate the cause of the short circuit.

The oscillator 60 also provides a timing reference signal for the reset module 68 in order to provide for the automatic reset feature. This feature is described in more detail below.

Reference is next made to FIGS. 3(*a*) to 3(*c*) which show the high voltage circuit 14 in more detail. The values for the components shown in FIG. 3 are listed in the Table below. As shown in FIG. 3(*a*), terminal 72 connects to terminal 11 for the 140 VDC input and terminal 74 connects to terminal 13 for the 20 VAC input. The ground terminal 9 is connected to terminal 76. The 140 VDC input is "smoothed" by a capacitor 402 and resistor 403. The 20 VAC input is rectified by a diode 404 and smoothed by a capacitor 405. The rectified 20 VAC provides the input to a voltage regulator 78 on terminal 80. The voltage regulator 78 is shown in FIG. 3(*b*) and comprises a conventional device such as the LM7812 from National Semiconductor. The regulator 78 provides a +12 Volt rail 82 and includes a capacitor 406 for smoothing the +12 Volt output. The +12 Volt rail 82 provides the supply voltage for components comprising the high voltage circuit 14. The high voltage circuit 14 also includes the surge suppressor 39. The function of the surge suppressor 39 is protect the circuit 14 by shunting voltage spikes to ground. As shown the surge suppressor 39 comprises a varistor 41 with one terminal connected to ground and the other terminal connected to the conductor 29 which is also connected to the chassis.

Referring back to FIG. 3(*a*), the 140 VDC feed energizes the primary winding of the high voltage transformer 54. The primary winding of the transformer 54 has a centre-tap 84 which receives the 140 VDC. As shown in FIG. 3(*a*), the 140 VDC is coupled to the centre-tap 84 through a branch of the short circuit protection module 77. (The terminals of the primary winding are connected to the output drive module 52 and operated in a "push-pull" manner as described below.)

The short circuit protection module 77 comprises an inductor 86 connected in series between the 140 VDC input 72 and the centre-tap 84 of the high voltage transformer 54. The branch also includes a wired fuse 88 and a capacitor 407 in parallel with the inductor 86. The inductor 86 is magnetically coupled to a reed switch 90. One terminal of the reed switch 90 is coupled to a voltage input 92. The other terminal of the switch 90 forms an output 94 which is coupled to an input of the overload protection module 66. As shown in FIG. 3(*a*), the output terminal of the reed switch 90 includes resistors 408, 409 and capacitor 410 for conditioning the output signal at terminal 94.

If a short circuit condition arises, the high voltage transformer 54 will draw current which produces a magnetic field in the inductor 86. The magnetic field, in turn, "trips" the reed switch 90 which produces a pulse at terminal 94 for the overload protection module 66 at the terminal 94. The resulting pulse triggers the overload protection module 66 and causes the pulse control module 50 to become disabled as will be described in more detail below.

In a variation of the short circuit protection module 77 the Reed switch 90 and inductor 86 are replaced by a photodiode and phototransistor arrangement as shown in FIG. 3(*a*) and denoted by reference 79. The implementation of the circuit 79 as shown in FIG. 3(*a*) is within the knowledge of one skilled in the art.

Reference is next made to FIG. 3(*b*). The oscillator 60 is implemented using a programmable timer chip 96, such as the MC14541 available from Motorola Corporation. The timer chip 96 is configurable to provide an output signal 98 on pin 1 between 16 kHz to 22 kHz. The appropriate selection of the values for resistors 411, 412 and capacitors 413, 414 coupled to pins 2 and 3 of the timer chip 96 and the voltage level connected to pin 12 is within the understanding of those skilled in the art. (Exemplary values for the resistors and capacitors are provided in the Table below for a 19 kHz signal 98.) The timer chip 96 also includes a 16-stage binary counter which provides a timing signal on output pin 8 for use by the reset module 68.

The 19 kHz signal 98 provides the reference signal for the pulse control module 50 and is buffered by the buffer stage 62. As shown in FIG. 3(*b*), the buffer stage 62 is implemented using a single package chip containing six inverters 100 to 110, such as the MC4049 available from Motorola Corporation. The individual inverters are cascaded in pairs 100,102 and 104,106 and 108,110 to produce respective non-inverting buffers. The buffer stage produces two buffered output reference signals 112, 114 which are 180° out of phase. The buffered output signals 112, 114 provide the reference inputs to the pulse control module 50. As shown in FIG. 3(*b*), the inverters 104, 108 are also coupled to the overload protection module 66 through respective diodes 415, 416 and resistors 417, 418. This aspect is described in further detail below.

The pulse control module 50 and the output drive module 52 comprise a "push-pull" arrangement which drives the high voltage transformer 54. The push-pull arrangement produces a more efficient power output from the high voltage transformer 54.

As shown in FIG. 3(*a*), the output drive module 52 comprises a pair of power transistors 116, 118. The outputs, i.e. drain and source, of the transistors 116, 118 are coupled to the primary winding of the high voltage transformer 54. The control input, e.g. gate, of the transistors 116, 118 are coupled to respective outputs 120, 122 of the pulse control module 50. The pulse control module 50 produces pulse trains 124, 126 which switch the respective transistors 116, 118 ON and OFF, thereby controlling the current flowing in the primary winding of the transformer 54. As described above, the high voltage transformer 54 has the centre-tap 84 on the primary winding which is connected to the 140 VDC supply. The current flowing in the primary winding induces a voltage in the secondary winding of the transformer 54. The voltage induced in the secondary winding is multiplied by the high voltage multiplier 56 to generate a high voltage at the output 58.

The pulse control module 50 comprises a pair of monostable multivibrators 128, 130 which are implemented using first and second LM555 type timer chips 132 and 134. As will be understood by those skilled in the art each of the 555 timer chips 132, 134 has a network of resistors and capacitors which configure the timer chips 132, 134 as monostable multivibrators (i.e. pulse generators). (Exemplary values for the resistors 419 to 425 and capacitors 426, 427 are provided in the Table below.) The reference signal 112 provides the "trigger" signal for the first monostable vibrator or pulse generator 128, and the reference signal 114 provides the "trigger" signal for the second monostable 130. In response to the reference signal 112, the first pulse generator 128 generates the pulse signal output 124 which drives the gate of the power transistor 116. Similarly, the second pulse generator 130 produces the pulse signal 126 which drives the gate of the second power transistor 118. The duty cycle of each pulse signal 124, 126 is determined by a resistor/capacitor network connected to the THRESHOLD and DISCHARGE inputs of the respective 555 timer chip 132, 134 as will be within the understanding of those skilled in the art. In the preferred embodiment, the duty cycle is approximately 25%. To protect the transistors 116, 118 the outputs of the pulse generators 128, 130 include resistors 428, 429 as shown in FIG. 3(b).

Preferably, the transistors 116, 118 comprise insulated-gate bipolar power transistors of the type available from International Rectifier, e.g. model no. IRGPC50FD2 is suitable.

Figure 5:
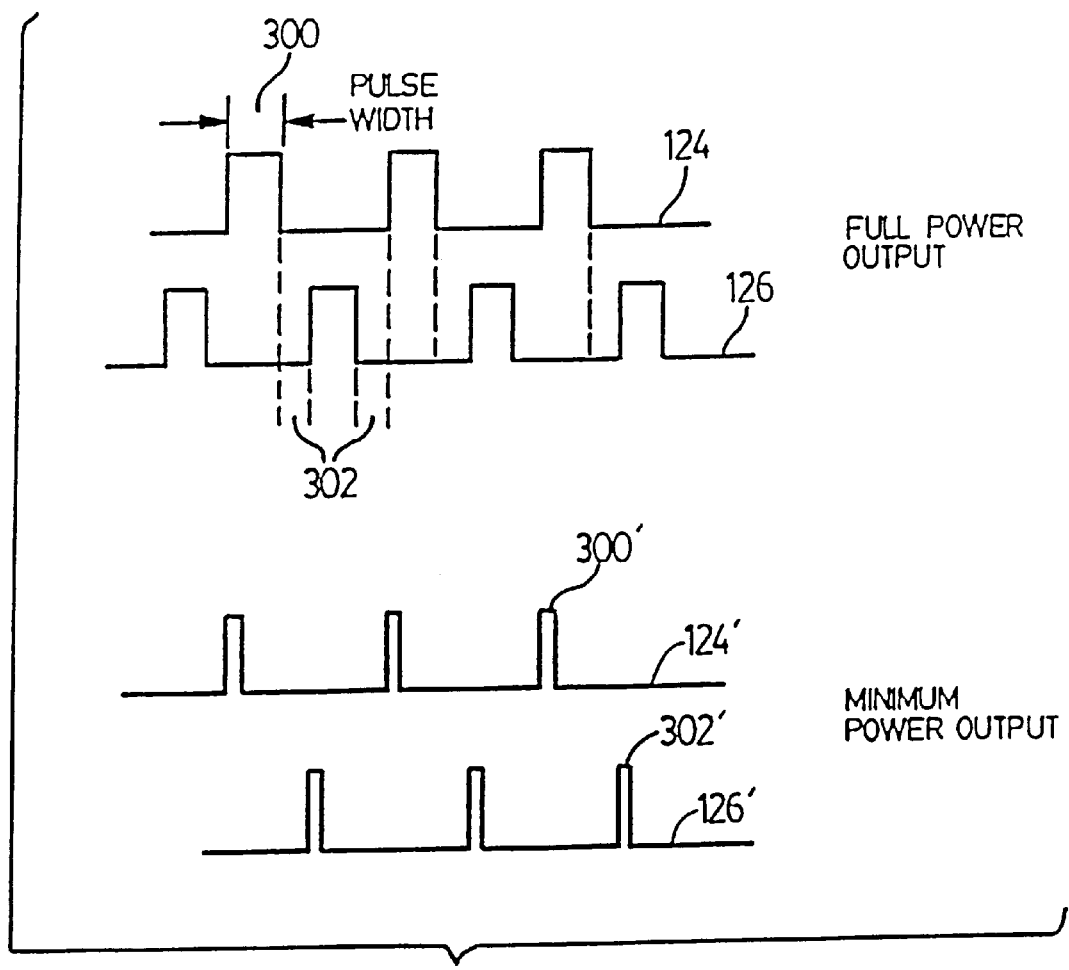
FIG. 5 is a timing diagram showing the relationship between selected control signals generated in the circuit of FIG. 3.

The relationship between the pulse signals 124, 126 is shown in FIG. 5. There is a phase shift or time lag between the pulse signals 124, 126 which produces the "push-pull" action for the power transistors 116, 118, i.e. when the first transistor 116 is ON, the second transistor 118 is OFF. When the high voltage circuit 14 is set to full power output (e.g. using potentiometer 146—FIG. 3(c)), each pulse has a width of approximately 15 microseconds. At minimum power output, the pulse width for the pulse signals 124, 126 is approximately in micro-second range.

Referring back to FIG. 3(a), the primary winding of the high voltage transformer 54 includes the centre-tap 84 which is connected to the 140 VDC feed from the power supply module 70. In response to the pulse control signals 124, 126, the current is first "pushed" and then "pulled" through the primary winding of the transformer 54. For example, when the first transistor 116 is ON, the second transistor 118 is OFF, and current flows through the first transistor 116 and a voltage is induced in the secondary winding of the transformer 54. Conversely, when the second transistor 118 is ON, the first transistor 116 is OFF, and current flows in the opposite direction through the second transistor 118 and the primary winding of the transformer 54. The push-pull arrangement according to the present invention reduces the magnetization of the core of the high voltage transformer which would occur if the primary winding was excited in only one direction, e.g. CLASS A mode. Because the operation of the transistors 116, 118 alternates the current direction in the primary winding, the magnetic field in the transformer core is allowed to collapse during the time lag between respective pulses in the signals 124, 126 (FIG. 5). This allows the transformer 54 to operate more efficiently. As shown in FIG. 3(a), a resistor 430 and a capacitor 431 is connected across the primary winding of the transformer 54. The resistor 430 and the capacitor 431 help control transients which may arise in the primary winding as a result of the switching of the transistors 116, 118.

Referring again to FIG. 3(a), each time one of the transistors 116, 118 is switched on, a current flows in the primary winding and a voltage is induced in the secondary winding of the transformer 54. The secondary winding of the transformer 54 "steps-up" induced voltage and the induced voltage is increased up to 135 kV through the operation of the high voltage multiplier 56.

Figure 6A:
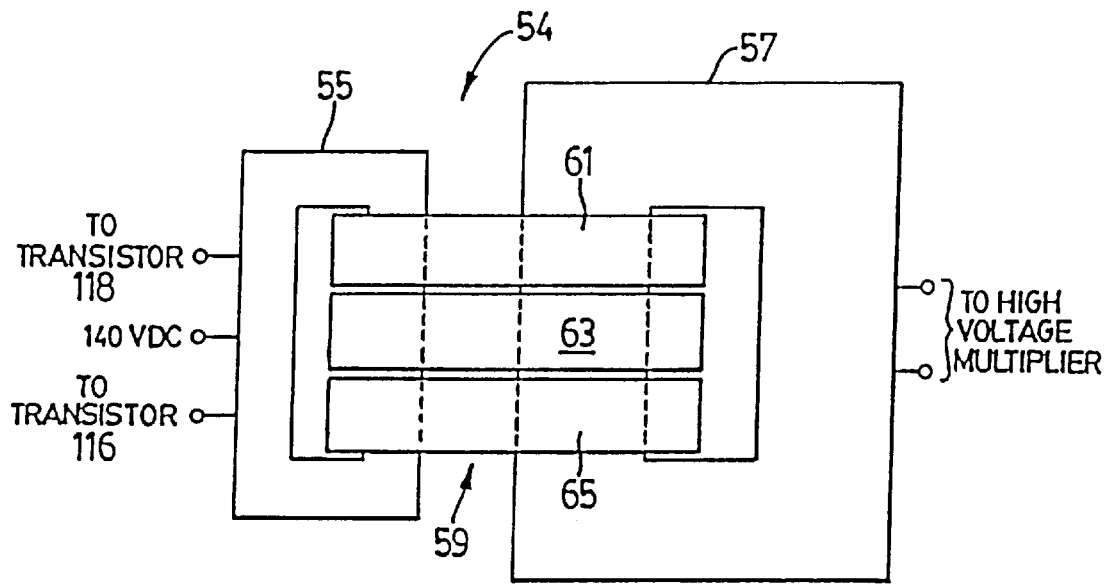
FIGS. 6(a) and 6(b) show in schematic form a transformer according to the present invention.
Figure 6B:
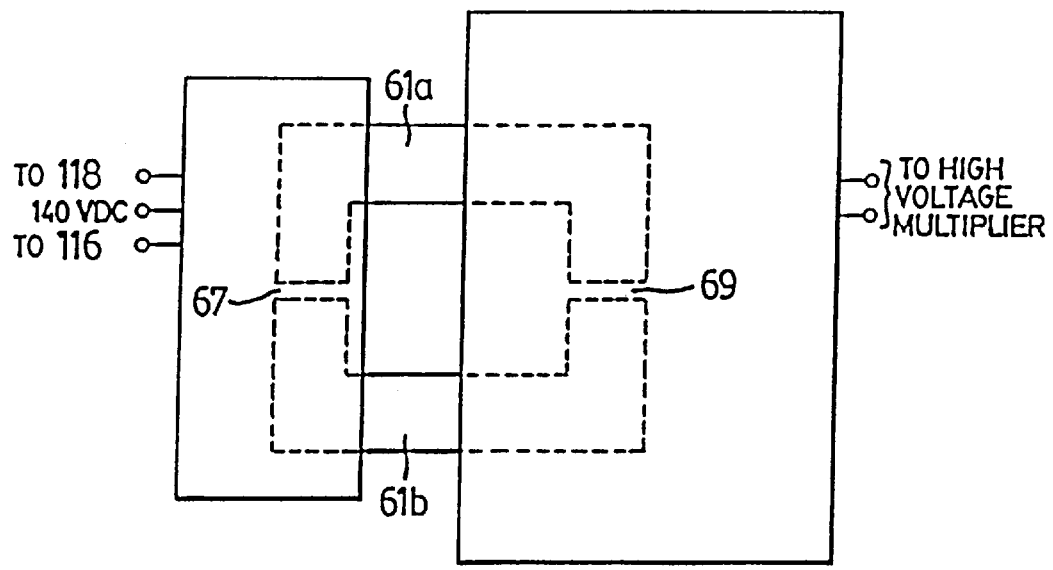

According to another aspect of the present invention, the high voltage transformer 54 comprises a multi-core arrangement as depicted in FIGS. 6(a) and 6(b). The transformer 54 comprises a primary winding 55, a secondary winding 57, and a multiple core 59. The multiple core 59 comprises three ferrite cores 61,63,65. Each ferrite core 61,63,65 has air gaps 67,69 to reduce hysteresis in the core. The primary winding 55 comprises 18 turns for each core 61,63,65, and the turns ratio for the secondary winding 57 is approximately 1/50. The secondary winding 57 is preferably vacuum sealed in epoxy resin. It will be appreciated that the multiple core arrangement depicted in FIG. 6 has the advantage of limiting the Eddy currents to each core 61,63,65.

According to this aspect of the invention, the transformer 54 comprises a triple core arrangement 59 in order to generate a high voltage output on the secondary 57 without requiring a high turns ratio. By limiting the turns ratio, the size of the transformer 54 is reduced.

The triple core arrangement for the transformer 54 shown in FIG. 6 is suitable for a 150 Watt system. For a 100 Watt system, a two core arrangement, e.g. 61 and 63, is possible with the turns ratio for the secondary winding suitably modified. For a 50 Watt system, a single core arrangement is possible with the turns ratio suitably modified.

To further increase the output to 135 kV, the transformer 54 is operated in resonance. The transformer 54 and the high voltage multiplier 56 comprise a "tuned" circuit. The higher frequency the more efficient the transformer 54 and the higher the output, however, the limitation becomes the switching frequency of the transistors 116, 118 in the pulse control module 50. For the transistors 116, 118 being used utilized the switching frequency is selected in the range 16 kHz to 22 kHz. The air gap 67,69 is approximately 0.004 inches and adjusted so that the transformer 54 produces 7.5 kV peak output at resonance.

As shown in FIG. 3(a) the secondary winding is coupled to the high voltage multiplier 56. The high voltage multiplier 56 comprises a series of cascaded stages. The multiplier comprises seven cascaded stages, three of which are shown and denoted by references 136, 138, 140. Each cascaded stage is formed from a series of capacitors and diodes. The capacitors and diodes are configured as a voltage multiplier as will be understood by those skilled in the art. (If the insulated wire 23 is used with the ring 30, the capacitance of the wire 23 is factored into the cascade stage.) The function of the high voltage multiplier 56 is to further increase or multiply the "step-up" voltage produced in the secondary winding of the transformer 54 (through the "push-pull" switching of the 140 VDC in the primary winding of the transformer 54).

In the present configuration, i.e. the tuned circuit comprising the transformer 54 and the voltage multiplier 56, the output is as high as 135 kV, and the capacitors are 680 picofarads and rated at 15 KV. The diodes are rated for 35 kV RMS at 2 milliamperes (mA). The output of the high voltage multiplier 54 is electrically coupled to the discharge rod 20 by the electrical contact 21 (FIG. 1). The "tuned" high voltage multiplier 56 is shown in FIG. 7 and described below. With suitable modifications to the high voltage transformer 54 and the high voltage multiplier 56 (e.g. increasing the number of stages), an output voltage around 180 kV may be achieved.

Referring to FIG. 3(a), a third winding 142 on the core of the high voltage transformer 54 provides an input 144 for the output regulator 64. The function of the output regulator 64 is to regulate or control the output voltage produced by the circuit 14. The regulator 64 is also configurable to regulate the output current. In voltage regulation mode, the output voltage level is held at a level as set through the potentiometer 146 (FIG. 3(c)). In current regulation mode, the current is maintained at a predetermined level, e.g. 250 $\mu$A and the voltage is allowed to vary between 60 kV to 135 kV, and will depend on the current needed to charge the particulate in the air 34.

The output voltage is regulated by controlling the duty cycle of the pulses 124, 126 (FIG. 3(b)) based on the desired output voltage level. The output voltage level is set by the potentiometer 146 shown in FIG. 3(c), which is coupled to the winding 142. The potentiometer 146 is preferably located inside the control panel 38 so as to be accessible only to a trained technician. The wiper of the potentiometer 146 forms the terminal 23 and is coupled to a Zener diode 148 at terminal 155 in the regulator 64. The Zener diode 148 provides the input for the regulator 64. The other terminal 21 of the adjust dial 42 is connected to the terminal 144 at the winding 142.

Referring to FIG. 3(b), the output regulator 64 comprises a NPN transistor 150 and a PNP transistor 152. The cathode of the Zener diode 148 is coupled to the collector of the NPN transistor 150 through a resistor 432 and the anode of the diode 148 is coupled to the base of the NPN transistor 150 through a resistor 433. The base of the NPN 150 is also coupled to signal ground through a diode 434. The collector of the NPN 150 is coupled to the base of the PNP transistor 152 through a resistor 435. The base of the PNP 152 is also coupled through a resistor 436 to the output 154 from the overload protection module 66. The emitter of the PNP 152 is tied to 12 Volts through two diodes 437. The diodes 437 bias the PNP 152 so that the minimum pulse width is limited to 0.2 $\mu$s. The collector of the PNP transistor 152 provides the output for the regulator 64 and is coupled to the pulse control module 50 through a capacitor 438. The resistor 435 and capacitor 438 produce a bias voltage for the resistor/capacitor networks for the 555 timers 132, 138 and control the duty cycle of the respective pulse signals 124, 126.

In voltage regulation mode, the voltage induced in the winding 142 (FIG. 3(a)) is proportional to the output voltage at the output 58 of the circuit 14. When the voltage in the winding 142 exceeds the threshold level (as set by the potentiometer 146—FIG. 3(c)), the zener diode 148 will conduct causing the NPN transistor 150 to turn ON. This in turn causes the PNP transistor 152 to turn ON and the bias voltage on the capacitor 438 changes thereby causing the pulse width and the duty cycle of the pulse signals 124, 126 to decrease. By varying the duty cycle of the signals 124, 126, the level at the high voltage output 58 and ionization is varied. In the present embodiment, the output voltage is regulated to 135 kV at 1.0 mA, or to 100 kV at 1.5 mA.

Referring to FIG. 3(b), when the overload protection module 66 is triggered the output 154 is pulled LOW and the PNP transistor 152 is turned OFF. This effectively disables the 555 timers 132, 134 as will be described in more detail below.

In another aspect, the output regulator 64 allows the output current level to be controlled. It has been found that current regulation is ideal for cleaning air which contains a lot of particulate matter, and the more particulate matter the easier it is to charge and maintain the charge. In other words, the more particulate matter the lower the current required once the particulate is charged. Voltage regulation, on the other hand, is preferable when the air is relatively clean, e.g. office spaces, because it takes more current to charge the particulate in current regulation mode.

To select current regulation, there is a terminal 151 which is connected to node 170 (i.e. the output of the filter network 87) and a switch or jumper 153. The jumper 153 couples the terminal 151, i.e. output of the filter 87 to the anode of the zener diode 148 at terminal 155. In current regulation mode the NPN transistor 150 is coupled to the output of the filter network 87, and the current flowing controls the NPN transistor 150 which in turn controls the PNP transistor 152 and the bias voltage on the capacitor 438. For the component values shown in the Table below, the output current is regulated at 250 $\mu$A.

As shown in FIG. 2, the filter network 87 couples the output signal from the high voltage multiplier 56 to the overload protection module 66. The function of the filter network 87 is to condition the output signal from the voltage multiplier 56 in order to prevent false triggering of the protection module 66.

Referring to FIG. 3(b), the filter network 87 comprises a branch having resistors 445 to 448 and capacitors 449 to 451 connected as shown. The other branch of the filter network 87 comprises capacitor 452. The filter 87 has an input terminal 162 which is connected to the secondary winding of the high voltage transformer 54. The frequency characteristic of the filter network 87 is configured according to the resonant frequency of the transformer 54. The exemplary values for the resistors and capacitors provided in the Table are suitable for the 19 kHz switching frequency. For 16 kHz operation, a suitable value for the resistors 445 to 448 is 1.1 K, and for 20 kHz operation, a suitable value for the resistors 445 to 448 is 560 Ohms.

As shown in FIG. 3(a), the output 164 from the high voltage multiplier 56 includes a network 166 comprising a varistor 168, a blocking diode 452, resistors 453 and 454, and capacitors 455, 456 connected as shown. The function of the network 166 is to "smooth" output signal tapped from the voltage multiplier 56. The varistor 168 absorbs spikes in the output signal from the multiplier 56 by shunting them to ground before they can reach the overload protection module 66.

Referring back to FIG. 3(b), at the input terminal 162 to the filter 87, the signal is split into the two branches. One branch shifts the phase of the signal forward, while the other branch shifts the phase of the signal back, so that when the signal is recombined at node 170, i.e. the input to the overload protection module 66, the ripple in the signal is effectively cancelled. In current regulation mode, the signal from the filter network 87 provides the input to the zener diode 148 as described above.

Referring to FIG. 3(b), the signal from the filter network 87 is input to the overload protection module 66 at node 170. The overload protection module 66 comprises first and second thyristors or silicon controlled rectifiers (SCR) 172 and 174. The first SCR 172 provides protection for overload voltage conditions. The second SCR 174 provides protection for temperature overload conditions. The SCR 172 disables the circuit 14 if a predetermined output current level is exceeded. The second SCR 174, on the other hand, disables the circuit 14 if a safe operating temperature is exceeded, for example 75° C. As shown in FIG. 3(b), each SCR 172, 174 includes an input network denoted respectively by 173 and 174.

The gate of the first SCR 172 receives the output signal from the filter network 87 (i.e. node 170) through a resistor 457. The value of the resistor 457 is selected so that the SCR 172 is triggered at the appropriate output level. (As described, the filter network 87 removes the ripples or spikes in the signal to prevent false triggering of the SCR 172.) The gate of the SCR 172 includes a diode 458 and capacitor 459 which form an input 176 for connecting to terminal 94, i.e. the output the short circuit protection module 67 shown in FIG. 3(a). The gate of the SCR 172 is also connected to signal ground through a thermistor 178 and a resistor 460 as shown in FIG. 3(b). The function of the thermistor 178 is to compensate the SCR 172 when the unit becomes warm. As the temperature rises inside the enclosure 12, the SCR 172 will become more sensitive and susceptible to false triggering.

In operation, when the output current exceeds the predetermined threshold level, the SCR 172 is triggered and the output of the SCR 172 goes LOW. (As shown in FIG. 3(b), the output of the SCR 172 is tied to +12 Volts through resistor 461.) When the output of the SCR 172 goes LOW, the pulse signals 112, 114 to the respective monostable vibrators 128, 130 are disabled, which, in turn, prevents the power transistors 116, 118 (FIG. 3(a)) from switching. As shown in FIG. 3(b), the output of the SCR 172 is also coupled to the base of the PNP transistor 152 in the regulator 64. Triggering of the SCR 172 also causes the regulator input to the 555 timers 132, 134 to be disabled. The monostable vibrators or pulse generators 128, 130 remain in the disabled state until the SCR 172 is reset by the reset module 68.

As shown in FIG. 3(b), the reset module 68 comprises a timer 180 and an output transistor 182. The timer 180 is configured to produce an output signal which turns on the transistor 182 after a predetermined time. The output transistor 182 is connected across the SCR 172. When turned on, the transistor 172 effectively "shorts-out" the SCR 172 and the SCR 172 is reset. (The SCR 172 resets below 0.7 Volts and the collector-emitter voltage for the transistor 182 in saturation is 0.2 Volts.) The timer 180 is implemented using the MC14566 industrial time base generator chip available from Motorola Corporation. The timer chip 180 has an input 184 which is connected to the output of the timer (oscillator) chip 96 for receiving a timing signal 186. The timer 180 is configured to produce an output signal for turning on the transistor 182 approximately every 4 minutes (PIN 12 of the oscillator chip 96 is tied to +12 Volts) or approximately every 4 seconds (PIN 12 of the oscillator chip 96 tied to GROUND) as will be within the understanding of one skilled in the art. As shown in FIG. 3(b), the output of the timer 180 is coupled to the base of the transistor 182 through resistor 462. The timer 180 itself is reset through the operation of the transistor 182. As shown, the timer 180 has a reset input 188 which is coupled to the collector of the transistor 182 through a resistor 463 and a capacitor 464.

Referring to FIG. 3(b), the second SCR 174 in conjunction with a thermistor 190 provides the over-heating protection for the high voltage circuit 14. The thermistor 190 is coupled to the gate of the SCR 174 through a zener diode 192, a resistor 465, and another zener diode 194 as shown in FIG. 3(b). The output of the SCR 174 is tied to +12 Volts through resistor 466 and also to the buffer inputs 104, 108 to the monostable vibrators 128, 130. When the operating temperature exceeds a predetermined threshold, e.g. 75° C., the SCR 174 is triggered and pulls the input to the buffers 104, 108 to ground thereby disabling the monostable vibrators 128, 130 (i.e. pulse generators). Since a high temperature condition may indicative of a malfunction, as opposed to an overload condition, a blocking diode 196 coupled to the SCR 174 prevents the SCR 174 from being automatically reset by the reset module 180. To reset the SCR 174 the unit must be powered down which is appropriately done by a technician who will also inspect the for a malfunction.

The overload protection module 66 also includes terminals 198, 200 for connecting to the current meter 48 (FIG. 3(c)). The terminal 198 is formed at the junction of capacitor 467 and resistor 468 which is connected to the output of the filter network 87 at node 170. The terminal 200 is formed at the junction of resistor 469 and signal ground. The other terminal of resistor 469 is connected to the gate of the SCR 174. The terminal 198 is connected to terminal 27 of the meter 48 and terminal 200 is connected to the "return" terminal 25 as shown in FIG. 3(c). The meter 48 includes a calibration resistor 202. Terminal 25 of the meter 48 is connected to the potentiometer 146 through resistor 470 as shown in FIG. 3(c).

As shown in FIG. 3(a), the power output indicator 46 is also connected to the winding 142 through a drive circuit 158. The lamp 46 is connected to the drive circuit 158 at terminal 19 (FIG. 3(a)). The drive circuit 158 for the lamp 46 comprises a transistor 160. The base of the transistor 160 is coupled to the winding 142 through resistor 439, capacitor 440 and rectifying diode 441. The collector of the transistor 160 is coupled to terminal 19 through diode 442. The drive circuit 158 also includes another diode 443 and resistor 444 which couple the terminal 19 to signal ground.

In operation, the lamp 46 will glow dimly when the unit is on. When a voltage is induced in the winding 142, a base current will flow causing the transistor 160 to turn ON and the collector current causes the lamp 46 to glow brightly. If the output of the ionizer 4 has been shorted, the continuous resetting of the overload protection module 66 will cause the lamp 46 to flicker every 4 minutes (or 4 seconds).

Referring to FIG. 3(a), the anode of the diode 441 is also coupled to a terminal 220. The terminal 220 connects to the input terminal of a circuit 222 shown in FIG. 3(b). The circuit. 222 provides output terminal 224 and test point terminal 226. The circuit 222 processes the negative portion of the output at the coil 142. The circuit 222 comprises capacitors 471,472, diode 473, and resistor 474. Exemplary component values are provided in the Table below.

As described above, the high voltage multiplier 56 and the transformer 54 can comprise a "tuned" circuit. Reference is next made to FIGS. 7(a) to 7(c) which show the high voltage multiplier 56 according to this aspect of the present invention. The high voltage multiplier 56 comprises an enclosure denoted generally by reference 204. The enclosure 204 comprises a compartment 206 for housing the cascaded stages 136, 138, 140 (FIG. 3(a)) of the multiplier 56 and a tube 208 for connecting the output wire 58. The cascaded stages (e.g 136, 138, 140) are formed from diodes and capacitors denoted respectively by D and C. The input to the multiplier 56 is connected to the secondary winding of the high voltage transformer 54 through an AC wire and a ground wire. A principle function of the high voltage multiplier 56 is to lower the capacitance between the AC and ground in order to operate the transformer 54 in resonance.

As shown in FIG. 7, the compartment 206 has respective side channels 210, 212 for mounting the capacitors C and a bottom channel 214 for mounting the diodes D. The channels 210, 212, 214 are preferably filled with an epoxy material. The enclosure 204 includes one or more channels 216 for receiving dielectric materials in order to change the capacitance and therefore the impedance and output voltage produced by the high voltage multiplier 56.

For a 135 kV output, the high voltage multiplier 56 comprises 9 stages, and the capacitors C are 680 pF and rated at 15 kV, and the diodes D are rated at 35 kV and 2 mA.

It will be appreciated that the high voltage circuit 14 according to the present invention provides an elegant and cost-effective solution to implementing the ionizer 4. The high voltage circuit 14 combined with the modular design of the ionizer 4 provides a device which can easily be integrated with the existing duct work or arranged as an ionizer bank to replace known mechanical filter banks in an office building for example.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

TABLE FOR COMPONENT VALUES

| | | |
|---|---|---|
| Varistor | 41 | 120 V |
| Potentiometer | 146 | 50K |
| Zener Diode | 148 | 15 V |
| Transistor | 150 | 4624 |
| Transistor | 152 | 4626 |
| Transistor | 160 | U45 |
| Varistor | 168 | 20 V |
| SCR 1 | 172 | 5061 |
| SCR 2 | 174 | 5061 |
| Thermistor | 178 | 100K, 20° C. |
| Transistor | 182 | 4124 |
| Thermistor | 190 | 100K, 20° C. |
| Zener Diode | 192 | 7.8 V |
| Zener Diode | 194 | 7.5 V |
| Diode | 196 | 914 |
| Resistor | 400 | 1.5, 10 W |
| Diode | 401 | 8 A, 400 V |
| Capacitor | 402 | 680 µF, 200 V |
| Resistor | 403 | 100K, 1 W |
| Diode | 404 | 4007 |
| Capacitor | 405 | 1000 µF, 40 V |
| Capacitor | 406 | 2.2 µF |
| Capacitor | 407 | 2.2 µF |
| Resistor | 408 | 100K |
| Resistor | 409 | 220K |
| Capacitor | 410 | 1 nF |
| Resistor | 411 | 100K |
| Resistor | 412 | 220K |
| Capacitor | 413 | 180 pF |
| Capacitor | 414 | 50 pF |
| Diode | 415 | 914 |
| Diode | 416 | 914 |
| Resistor | 417 | 18K |
| Resistor | 418 | 18K |
| Resistor | 419 | 18K |
| Resistor | 420 | 18K |
| Resistor | 421 | 6.8K |
| Resistor | 422 | 1.8K |
| Resistor | 423 | 18K |
| Resistor | 424 | 18K |
| Resistor | 425 | 6.8K |
| Capacitor | 426 | 1 nF |
| Capacitor | 427 | 1 nF |
| Resistor | 428 | 27 Ohms |
| Resistor | 429 | 27 Ohms |
| Resistor | 430 | 5.6K |
| Capacitor | 431 | 150 pF |
| Resistor | 432 | 18K |
| Resistor | 433 | 820K |
| Diode | 434 | 914 |
| Resistor | 435 | 18K |
| Resistor | 436 | 47K |
| Diodes | 437 | 4126 |
| Capacitor | 438 | 0.1 µF |
| Resistor | 439 | 10K |
| Capacitor | 440 | 2.2 µF, 100 V |
| Diode | 441 | 4007 |
| Diode | 442 | 4007 |
| Diode | 443 | 4007 |
| Resistor | 444 | 100 Ohms, 1 W |
| Resistor | 445 | 680 (1.1K, 560 Ohms) |
| Resistor | 446 | 680 (1.1K, 560 Ohms) |
| Resistor | 447 | 680 (1.1K, 560 Ohms) |
| Resistor | 448 | 680 (1.1K, 560 Ohms) |
| Capacitor | 449 | 15 nF |
| Capacitor | 450 | 15 nF |
| Capacitor | 451 | 15 nF |
| Capacitor | 452 | 1 nF |
| Resistor | 453 | 18 Ohms |
| Resistor | 454 | 1K, 1 W |
| Capacitor | 455 | 0.1 µF |
| Capacitor | 456 | 2.2 µF, 100 V |
| Resistor | 457 | 220K |
| Diode | 458 | 914 |

-continued

TABLE FOR COMPONENT VALUES

| | | |
|---|---|---|
| Capacitor | 459 | 1 nF |
| Resistor | 460 | 57K |
| Resistor | 461 | 1.5K |
| Resistor | 462 | 18K |
| Resistor | 463 | 1M |
| Capacitor | 464 | 47 pF |
| Resistor | 465 | 18K |
| Resistor | 466 | 18K |
| Capacitor | 467 | 2.2 µF |
| Resistor | 468 | 2.2K |
| Resistor | 469 | 220K |
| Resistor | 470 | 12K |
| Capacitor | 471 | 0.1 µF |
| Capacitor | 472 | 680 pF |
| Diode | 473 | 4007 |
| Resistor | 474 | 6.8K |
| Resistor | 475 | 5K |
| Capacitor | 476 | 2.2 µF |

I claim:

1. An apparatus for purifying gas flowing in a duct by establishing a radially directed ionic wind within the duct to sweep particulate solids directly onto one or more collector electrodes, said apparatus comprising:

(a) an ionizing unit;

(b) means for supporting said ionizing unit within the duct, said ionizing unit comprising, (i) a water-tight housing, (ii) a high voltage generator within the housing for generating a high voltage output, said high voltage generator including a transformer and control means for energizing said transformer to produce said high voltage output, said control means having pulse generator means for generating pulses and a push-pull drive circuit coupled to said transformer and responsive to said pulses for energizing said transformer, and said high voltage generator including voltage multiplier means coupled to the output of said transformer for multiplying the output of said transformer to said high voltage output, and regulator means for regulating output current, (iii) an electrode support rod coupled to said high voltage output and extending from said housing coaxially within said duct, iv) at least one group of ionizing electrodes mounted on said support rod and extending radially therefrom; and (c) means for connecting said high voltage generator to an external low voltage power supply.

2. The apparatus as claimed in claim 1, wherein the duct wall comprises a collector electrode for collecting said particulate solids.

3. The apparatus as claimed in claim 2, wherein said ionizing unit includes a plurality of axially spaced groups of ionizing electrodes.

4. The apparatus as claimed in claim 1, further including a ring electrode positioned inside the duct and surrounding one group of said ionizing electrodes, said ring electrode having a diameter spanning a portion of the duct and being electrically connected to ground.

5. The apparatus as claimed in claim 4, wherein said ring electrode is supported by said electrode support rod.

6. The apparatus as claimed in claim 4, wherein said ring electrode is connected to and supported by the duct.

7. The apparatus as claimed in claim 1, wherein said regulator means comprises means for regulating said high voltage output.

8. The apparatus as claimed in claim 1, wherein said ionizing unit includes overload protection means for disabling said high voltage generator when said high voltage current output exceeds a predetermined level.

9. An air purifier for purifying air in an enclosed space in a building and said enclosed space being provided with an AC power supply, said air purifier comprising:

(a) an enclosure having at least one collecting electrode;

(b) an ionizing unit;

(c) means for supporting said ionizing unit inside said enclosure, said ionizing unit comprising, (i) a water-tight housing, (ii) a high voltage generator within said housing for generating a high voltage output, said high voltage generator including a transformer and control means for energizing said transformer to produce said high voltage output, said control means having pulse generator means for generating pulses and a push-pull drive circuit coupled to said transformer and responsive to said pulses for energizing said transformer, and said high voltage generator including voltage multiplier means coupled to the output of said transformer for multiplying the output of said transformer to said high voltage output, and regulator means for regulating output current, (iii) an electrode support rod coupled to said high voltage output and extending from said housing coaxially within said duct, (iv) at least one group of ionizing electrodes mounted on said support rod and extending radially therefrom for establishing a radially directed ionic wind within said enclosure to sweep particulate solids in the air directly onto said collector electrode;

(d) means for connecting said high voltage generator to the external AC power supply; and said enclosure including an air intake port and an air exhaust port.

10. The apparatus as claimed in claim 9, further including a fan for pulling air through said intake port and out through said exhaust port.

* * * * *